Nov. 12, 1963    E. O'SULLIVAN    3,110,466
APPARATUS FOR CONVEYING OR HANDLING VEHICLES AND THE LIKE
Filed Jan. 3, 1961    2 Sheets-Sheet 1
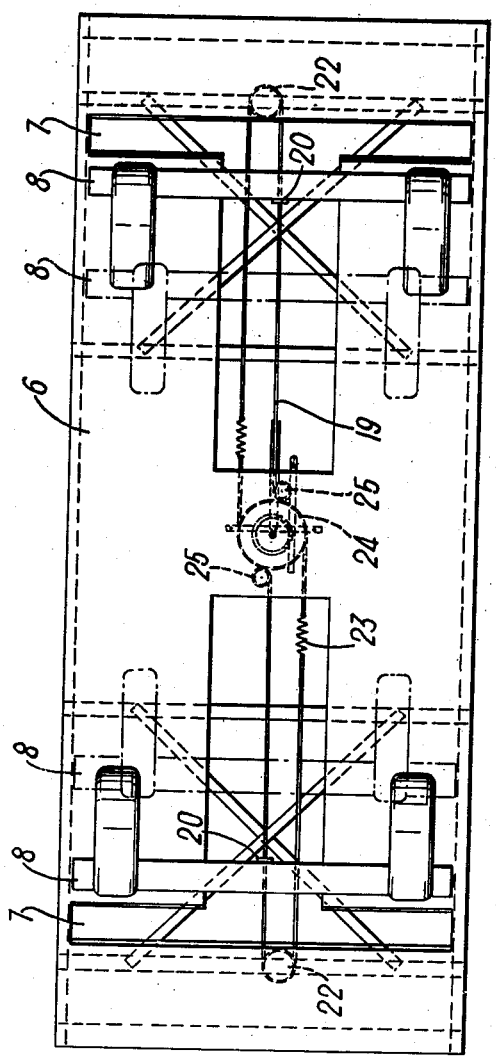
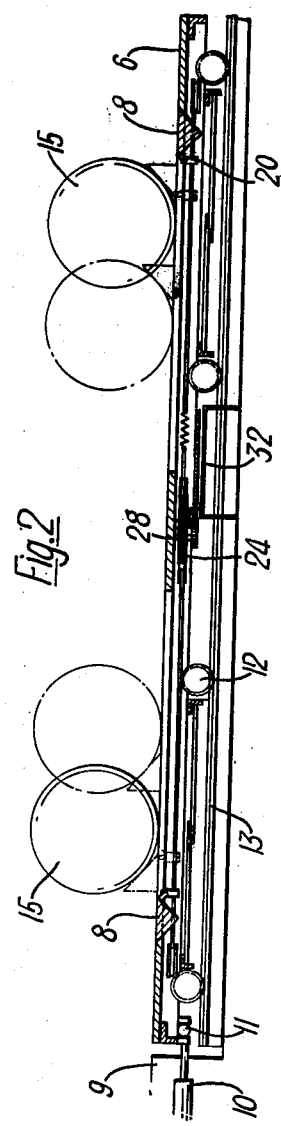
Inventor
Eugene O'Sullivan
By Watson, Cole, Grindle & Watson
Attorneys

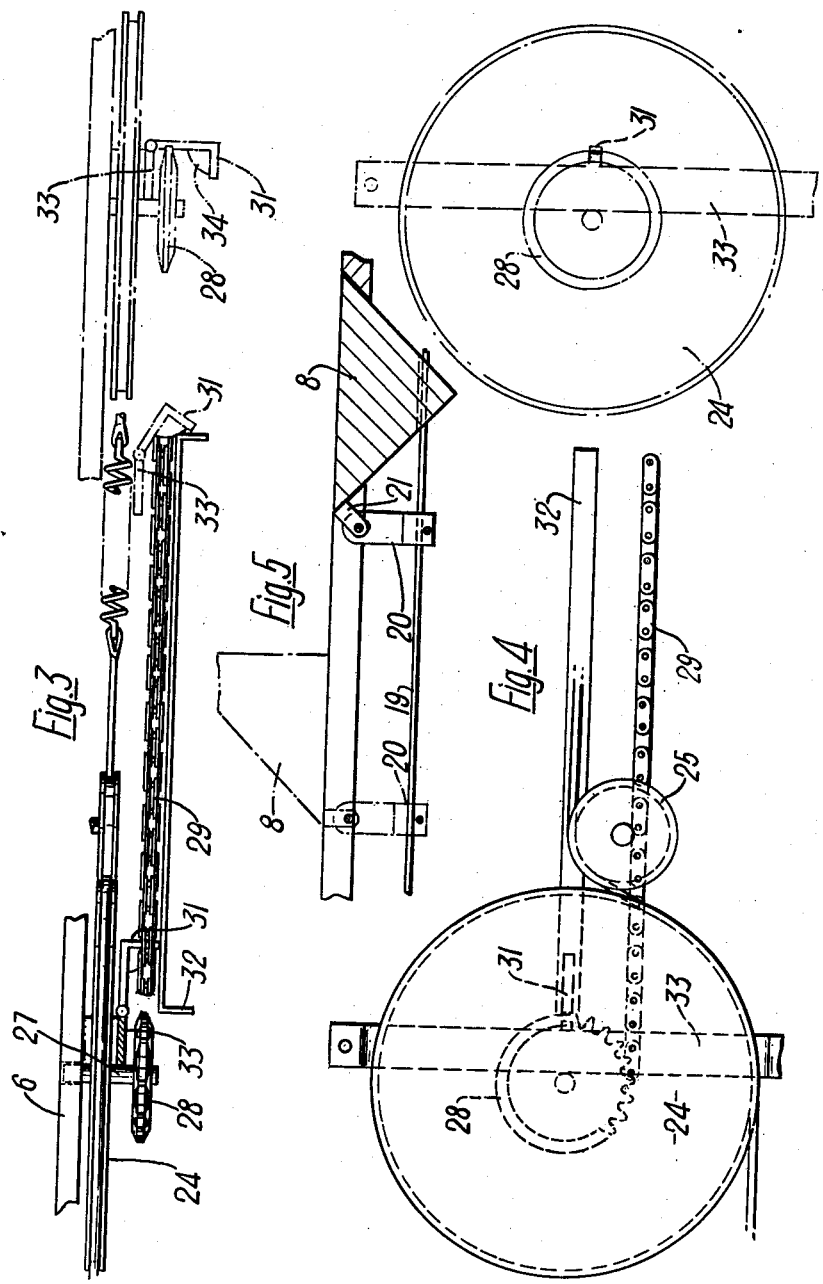

United States Patent Office 3,110,466
Patented Nov. 12, 1963

3,110,466
APPARATUS FOR CONVEYING OR HANDLING
VEHICLES AND THE LIKE
Eugene O'Sullivan, Cedarwood, Orpington Road,
Chislehurst, England
Filed Jan. 3, 1961, Ser. No. 80,435
6 Claims. (Cl. 248—119)

The present invention relates to apparatus for conveying or handling vehicles and like articles supported by wheels or castors and it is particularly concerned with a construction of a platform or pallet for hoisting or storing such articles.

Wheeled articles, for example motor vehicles, are under some circumstances handled upon platforms or pallets, for example for transferring such vehicles into the hold of a ship or in certain methods of storage or garaging of motor vehicles, particularly where the vehicles are stored in fixed or movable cages. One important advantage of the use of platforms for this purpose is that, since the driver and passengers leave the vehicles before they are placed in the cages, it becomes possible for the cages themselves to be only large enough to take the vehicle without it being necessary to make provision for opening the doors of the vehicle stored in the cage.

However, when such vehicles are handled upon a platform or pallet or for other similar purposes it is desirable to provide means for preventing inadvertent movement of the article on the platform, and the present invention is particularly directed to this problem. In accordance with the present invention triangular shaped chock members are movable simultaneously in opposite directions over the surface of the platform or pallet so as to engage between the latter and the support wheels of the load so that said load is held on the platform by the wedging action exerted by said chock members.

Said members extend transversely across the width of the platform or pallet and are accommodated in inoperative positions in transverse depressions or slots so as to leave a substantially smooth and unencumbered surface over which the wheeled load or vehicle may be moved.

These members are adapted to be operated simultaneously to lift them out of said depressions and to move them in opposite directions until they come into operative engagement with the wheels where they are wedged between the surfaces of the wheels and the decking surface of the platform.

One form of pallet or platform embodying the features of the present invention is shown by way of example on the accompanying drawings in which:

FIG. 1 is a plan view of the pallet or platform, the position of the four wheels of a vehicle being indicated in plan on the drawing, with the chock members in their operative positions, an alternative position for a smaller vehicle being indicated in chain dot lines, FIG. 2 is a longitudinal cross-section of FIG. 1, but with the chock members in the out-of-use position, FIG. 3 is a view on a larger scale illustrating the operating mechanism, FIG. 4 is a plan view of FIG. 3, and FIG. 5 is a detail showing the operation of the chock members.

As shown on FIG. 1 a platform or pallet 6 is provided of a suitable size to accommodate the maximum dimension of vehicle which may be expected to be handled on the platform. The platform itself may be of any suitable construction being shown in the form of a braced metal frame having a steel plate or other suitable decking. Towards each end of the platform there is a transversely directed depression or slot 7 into which a triangular shaped chock member 8 is adapted to enter when the platform or pallet is unoccupied by a vehicle so that the upper surface of the platform is substantially flush and hence the entry and removal of a vehicle from the platform is substantially unimpeded.

The apparatus shown on the drawings is particularly intended for the garaging of vehicles in cages in the manner described for example in British Patent No. 693,170, a cage being positioned to the righ-hand side of FIGS. 1 and 2 while the vehicle is adapted to run from the left-hand side on to the platform or pallet while in the loading position shown, from a suitable roadway surface 9 at about the same level. In some cases the surface 9 may be provided by means of an intermediate trolley flush with the roadway 9 and with the platform 6, said trolley serving as a pusher for inserting the loaded platform 6 into the cage or for removing it from the cage. In this case the vehicle is driven from roadway 9 over the surface of the trolley and then on to the platform. In the simplified embodiment shown, however, a hydraulic ram device or other suitable means is shown at 10 which is detachably coupled at 11 to the end of the platform so that operation of the ram 10 serves to push the loaded platform into the cage after which the ram can be disengaged at the connection 11 so as to leave the platform in the cage. Reversal of these operations may be utilised for extracting a platform from the cage when required.

The platform itself may carry support wheels 12 adapted to run on suitable fixed rails 13 and the cage which is to receive the platform may be provided with similarly positioned rails on to which the wheels 12 run as the platform is inserted into position in the cage.

Reverting now to the construction of the chock members 8, it will be seen that these are adapted to be brought to positions wedged beneath the wheels 15 of a vehicle to be accommodated on the platform and by virtue of the tapered or triangular shape of the chock members 8 they are capable of exerting a wedging action against the decking surface of the platform or trolley when subjected to pressure by incipient movement of the vehicle. Because the locking action of the chock members 8 is due to a self-engaging wedging action these chock members may be operated by a comparatively light drive mechanism since it is only necessary for the chocks to be brought into position between the wheels and the decking surface whereupon the chocking action is secured as a consequence of the wedging action.

Any suitable means may be provided for moving the chock members 8 to positions beneath the wheels of a vehicle and one simple arrangement for this purpose is shown on the accompanying drawings wherein an endless flexible wire cable or rope 19 is guided in a path having portions extending along the central longitudinal axis of the platform 6, which parts move at all times in mutually opposite directions and are suitably coupled by connecting members 20 to lugs 21 on the chocks 8 so that these chocks are moved simultaneously in opposite directions. To bring the chocks into the engagement position the two chock members 8 are moved one towards the other until they are both in engagement with the front and rear wheels of the vehicle to be fixed on the platform 6.

In the embodiment shown the cable or rope 19 passes at each end over reverser pulleys 22, the return run of the cable or rope including an extensible tension spring section 23. The cable 19 is guided over a central drive pulley 24 around opposed spans of approximately 90° thereon, being then guided into the central longitudinal axis by further guide pulleys 25. It will be seen that rotation of the drive pulley 24 will produce an oppositely directed movement in each case of that part of the cable or rope 19 which is coupled by members 20 to the chock members 8.

Any suitable means, for example an electric motor or a hydraulic or pneumatic drive, may be employed for operating the pulley 24. Conveniently, however, and since no great force is required for manipulating the chock members 8, the movement of the pulley 24 may be derived from the physical movement of the platform 6 as it moves away from the rest position shown on FIG. 2, or alternatively as it returns to the rest position from the operated position. For this purpose the pulley 24 is carried by a shaft 27 rotatably mounted on the under side of the platform 6 and carries a gear wheel or sprocket 28 so that the latter and the driving pulley 24 rotate in unison. The gear wheel or sprocket 28 is adapted to run into engagement with a stationary rack member 29 which may conveniently be provided by a suitable length of roller chain fixedly mounted from the support structure carrying the rails 13 on which the platform 6 runs.

It will be seen that when the platform 6 commences to move to the right of FIG. 2 the gear wheel or sprocket 28 engages the rack or chain 29 to rotate the driving pulley 24 which in turn displaces the cable or rope 19 to bring the chocks to the working position. At the starting position the chock members 8 are accommodated in the depressions 7 as indicated on FIG. 2 and as the platform commences to move the cable or rope 19 is operated by the pulley 24 so that the chock members rise out of the depressions 7 to the position shown in dotted lines on FIG. 2, where, after a predetermined degree of movement according to the size of vehicle and specifically according to the wheel base thereof, they come into engagement between the decking surface of the platform and the wheel so as to exert an effective chocking or locking action upon the vehicle. As soon as the chock members 8 are in firm engagement with the wheels further movement of the driving pulley 24 results merely in further stressing of the springs 23 until the gear wheel or sprocket 28 runs off the chain 29.

To prevent return movement of the pulley, and consequent slackening of the chock members 8, a pivoted catch member 31 is provided resting upon an inverted U-shaped fixed guide 32 in the starting position of the mechanism shown in FIG. 3. At the same time that the gear wheel or sprocket 28 comes out of engagement with the rack or chain 29 the catch member 31 runs off the end of the guide 32 and one limb portion of said member 31 then drops into engagement with one of the teeth of the gear wheel 28 as indicated to the right-hand side of FIG. 3 to serve as a lock upon said gear wheel and the driving pulley 24 thus holding the chock members 8 in position. Conveniently, and as shown, the member 31 is pivotally connected to a fixed arm 33 suitably mounted beneath the platform 6 and further said member 31 is of angle shape and is provided with a quadrant shaped weight or filler 34 which ensures that the member 31 functions correctly as it passes over the corner part of the guide 32.

When the platform returns to its starting position, perhaps loaded with a vehicle, as the platform approaches the FIG. 2 position the locking member 31 engages the guide 32 and lifts the former out of engagement with the gear wheel or sprocket 28 so that the latter is freed as it runs into engagement with the rack or chain 29, which thereupon moves the rope or cable 19 in the opposite direction so as to move the chock members 8 away from engagement with the wheels, and as the platform reaches its final position shown in FIG. 2 the chock members drop into the depressions 7 so that the vehicle may be readily driven off the platform and it is then ready to accept a new vehicle.

It will be understood that by using triangular shaped chocks in the manner indicated, comparatively light operating mechanism is sufficient to bring the chocks into position where they exert a wedging action and thus a highly efficient retaining action is secured by the frictional engagement of the chock members with the upper surface of the platform without it being necessary to bring any other locking equipment into operation. Further, these chock members may be conveniently accommodated in the depressions 7 when they are out of use, giving a smooth and unobstructed surface for passage of a vehicle and a comparatively small movement of said chocks out of said depressions is all that is required to bring the chocks into the working position.

What I claim is:

1. Apparatus for manipulating a vehicle comprising a vehicle supporting platform, triangular shaped chock members means to move said members simultaneously in opposite directions and in direct contact with the surface of the platform into chocking engagement with the wheels of the vehicle to be supported whereby said members engage between the latter and the wheels so that said vehicle is held on the platform by the wedging action exerted by said chock members, said triangular chock members being accommodated in correspondingly shaped recesses in the platform so that the top surface is flush with the platform but so that the chocking members can be drawn out of the recesses to move upon and in contact with the surface of the platform into the engagement position where an inclined surface comes into engagement with the wheels.

2. Apparatus as claimed in claim 1 wherein the chock members extend transversely across the width of the platform.

3. Apparatus as claimed in claim 1, wherein said chock members are operated simultaneously to lift them out of their recesses and to move them in mutually opposite directions until they come into operative engagement with the wheels to be wedged between the surfaces of the wheels and a decking surface of the platform.

4. Apparatus as claimed in claim 1, wherein a flexible cable drive is provided on the platform for moving the chock members simultaneously in opposite directions with portions thereof lying in line one with the other to move in opposite directions respectively.

5. Apparatus as claimed in claim 1, wherein a flexible cable drive is provided on the platform for moving the chock members simultaneously in opposite directions with portions thereof lying in line one with the other to move in opposite directions respectively, and in which a driving pulley is provided to actuate said cable and which is guided over wheels so as to embrace two opposite 90° sections of the driving pulley, and said cable having extensible spring members to absorb further movement imparted to the cable by the driving pulley after the chock members have been brought into operative engagement with the wheels.

6. Apparatus as claimed in claim 1, wherein a flexible cable drive is provided on the platform for moving the chock members simultaneously in opposite directions with portions thereof lying in line one with the other to move in opposite directions respectively, and in which a driving pulley is provided with a sprocket wheel engaging a fixed rack connected to the driving pulley.

References Cited in the file of this patent

UNITED STATES PATENTS

| 833,454 | Flemming | Oct. 16, 1906 |
| 2,834,486 | Straight | May 13, 1958 |
| 2,992,704 | Showker | July 18, 1961 |